Figure 1:
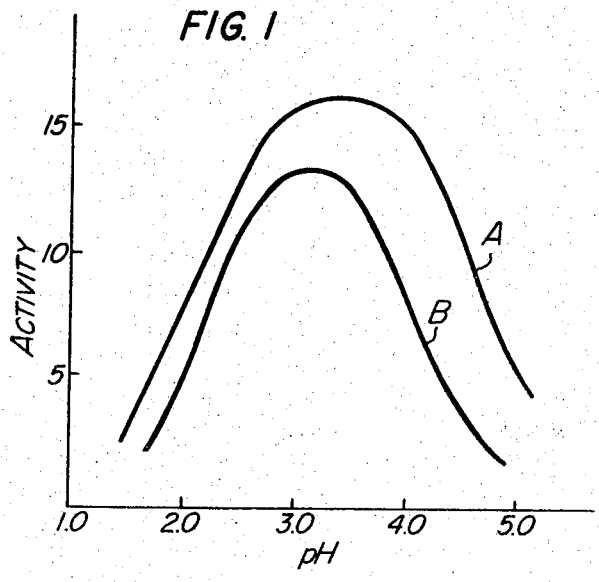

ically.com/">United States Patent [15] 3,645,850
Ichishima et al. [45] Feb. 29, 1972

[54] PREPARATION OF ACID CARBOXYPEPTIDASE

[72] Inventors: Eiji Ichishima; Fumihiko Yoshida, both of Noda-shi, Japan

[73] Assignee: Kikkoman Shoyu Co., Ltd., Noda-shi, Japan

[22] Filed: Apr. 8, 1969

[21] Appl. No.: 814,269

[30] Foreign Application Priority Data

Dec. 9, 1968 Japan...................................43/89525

[52] U.S. Cl. ...........................................195/66 R, 195/62
[51] Int. Cl........................................................C07g 7/028
[58] Field of Search ..................................195/62, 63, 66, 68

[56] References Cited

UNITED STATES PATENTS

| | | | |
|---|---|---|---|
| 3,063,911 | 11/1962 | Tanaka et al. | 195/66 X |
| 3,149,051 | 9/1964 | Yoshida et al. | 195/66 |
| 3,304,239 | 2/1967 | Zuber | 195/62 |
| 3,492,204 | 1/1970 | Koaze et al. | 195/62 X |

*Primary Examiner*—A. Louis Monacell
*Assistant Examiner*—D. M. Naff
*Attorney*—Cushman, Darby & Cushman

[57] ABSTRACT

A new enzyme, acid carboxypeptidase, whose significant characteristics are to give high activity at the low optimum pH, i.e., pH 1.5 to 5.5, and whose substrate specificity, molecular weight and other properties are entirely different from those of already known carboxypeptidase, is prepared by cultivating organism belonging to Aspergillus to obtain the crude enzyme solution and then purifying the above-obtained enzyme solution by one or more processes which include appropriately selecting and/or combining, of fractional precipitation, solvent precipitation, dialysis, various chromatographies, gel filtration. Said enzyme thereby obtained has the great advantage of enzymatically hydrolyzing protein and peptides within a low pH range where the danger of contamination is minimized.

1 Claims, 5 Drawing Figures

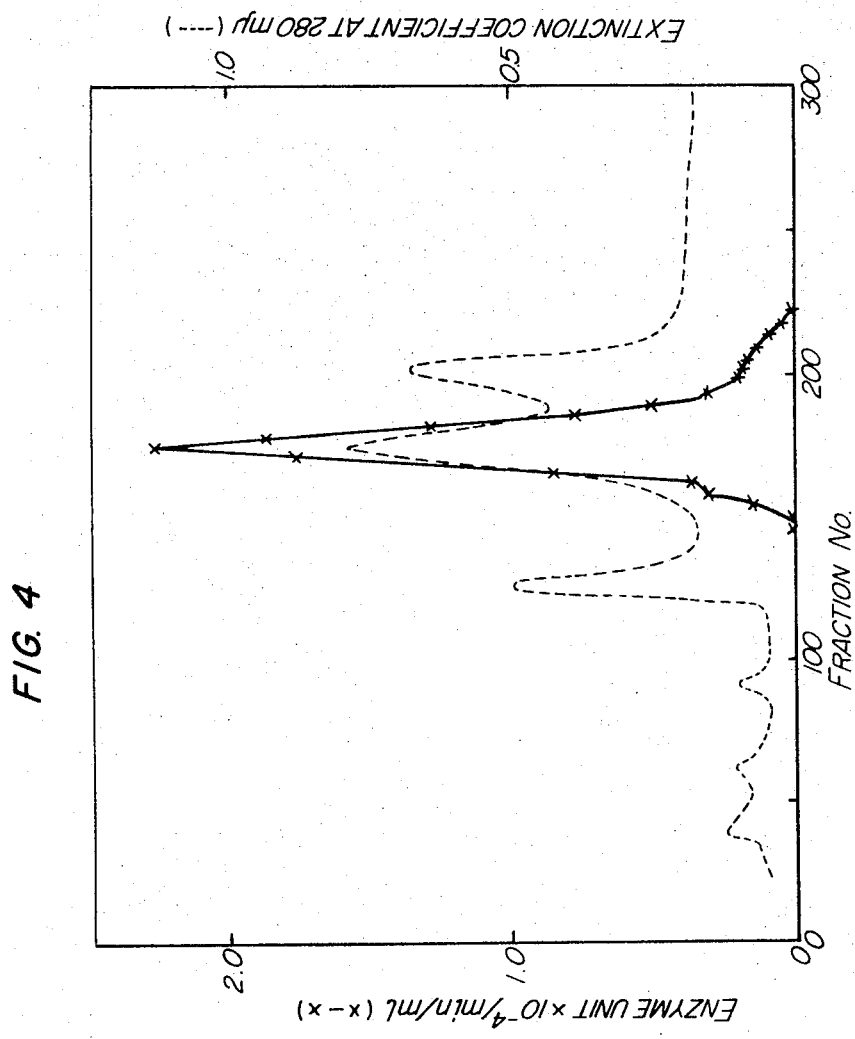

PREPARATION OF ACID CARBOXYPEPTIDASE

This invention relates to a new enzyme, carboxypeptidase acid, and the preparation thereof.

The enzyme, carboxypeptidase, is known as including carboxypeptidases A and B which are extracted from animal pancreas, and C from fruit substances. Such enzymes as representated by carboxypeptidases A and B are known to react to liberate amino acids step by step from the terminal carboxyl of protein or peptide, and the optimum pH for this reaction is about 7.5. On the other hand, the pH at which this occurs in carboxypeptidase C falls somewhat towards the acidic side with the optimum of about 5.3.

The inventors have separated a new type of carboxypeptidase wherein the terminal amino acid is liberated within the pH range from 1.5 to 5.5, and whose substrate specificity is entirely different from those of the known types. This new enzyme was named as acid carboxypeptidase according to the nomenclature for enzymes given in the Report of the Commission on Enzymes of the International Union of Biochemistry, published in 1961. And, said new enzyme can be produced by culturing molds which belong to genus Aspergillus.

Figure 5:
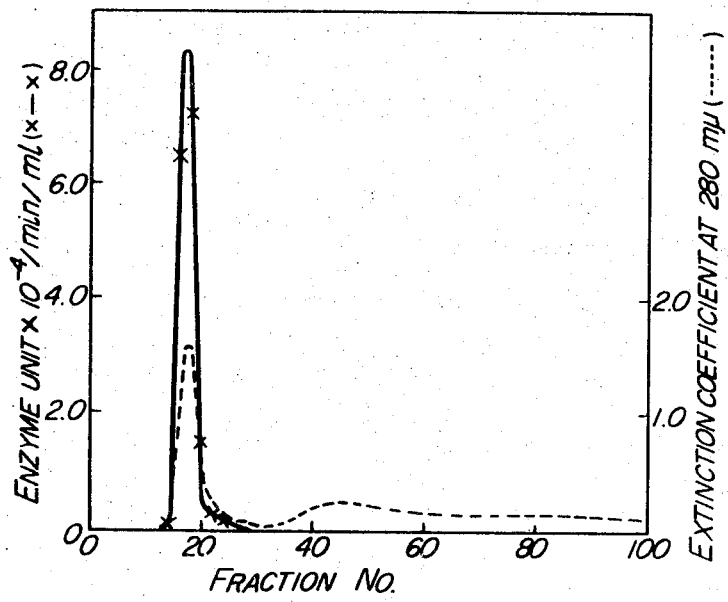
Figure 2:
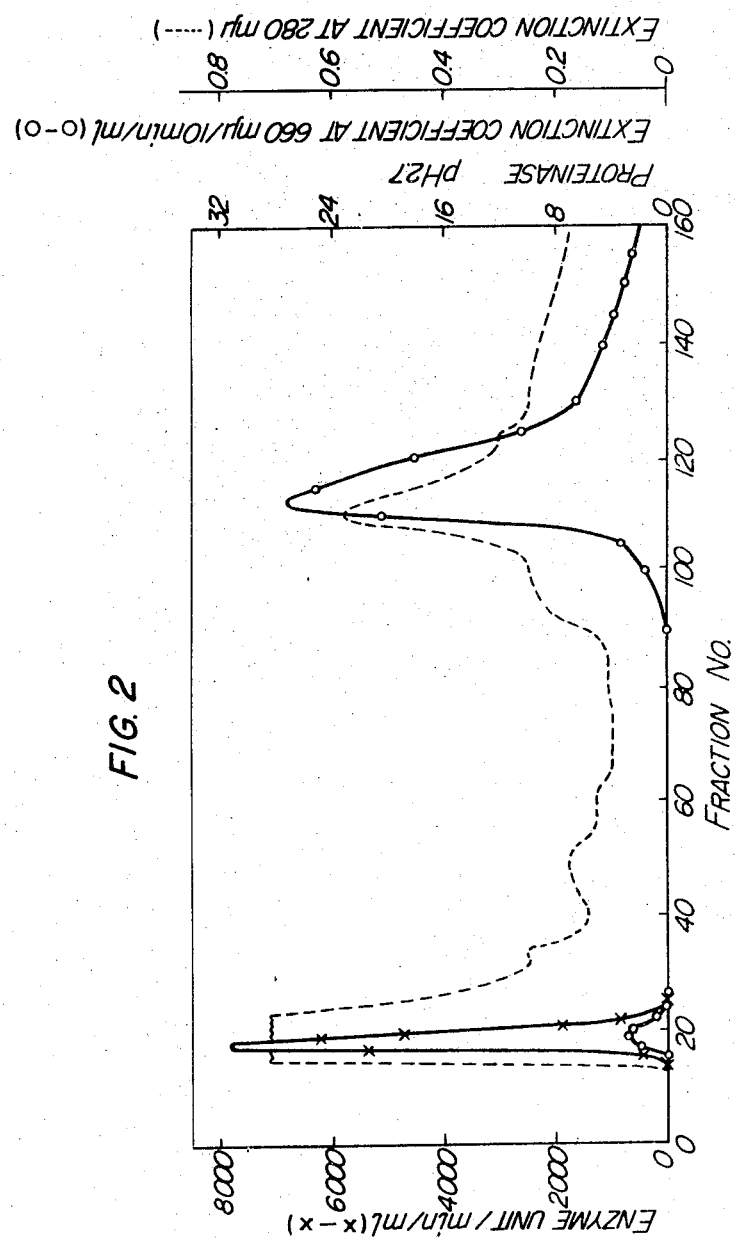
Figure 3:
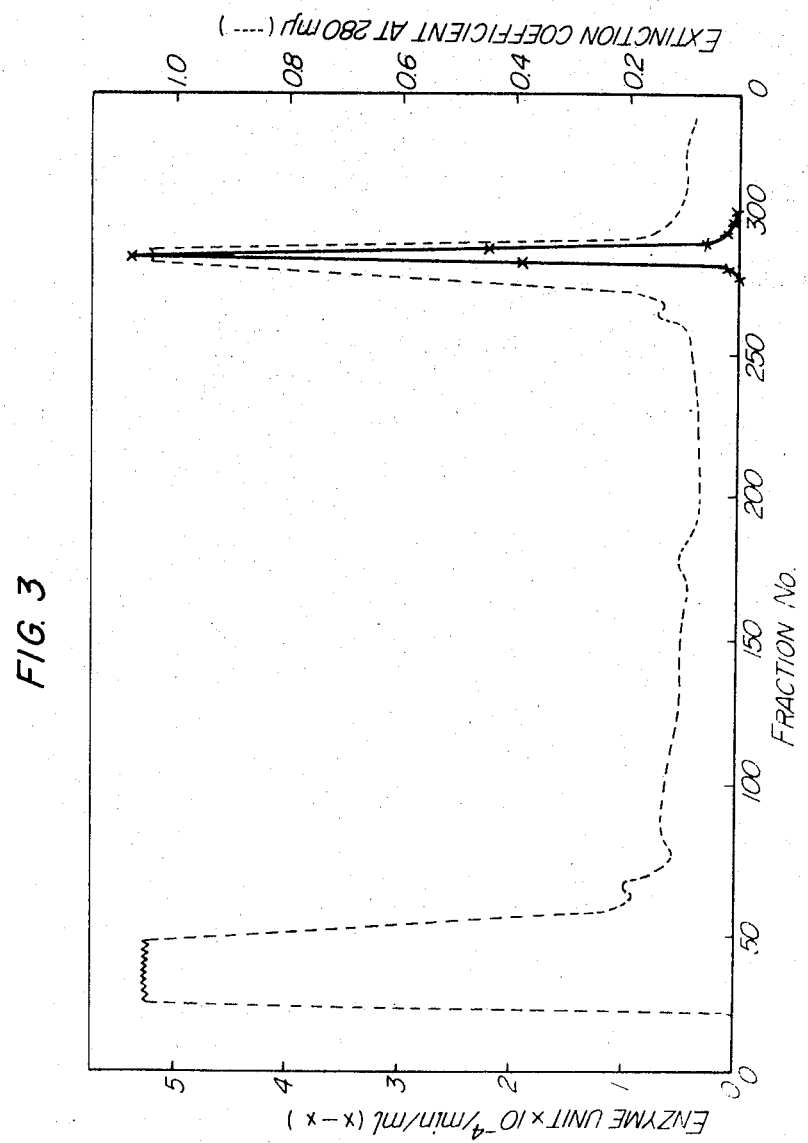

Referring to the diagrams hereto attached,

FIG. 1 shows the influence of pH on the activity of acid carboxypeptidase;

FIGS. 2 through 4, the results of chromatography of acid carboxypeptidase by means of weakly acidic cation exchange resin (Duolite CS-101) (FIG. 2), phospho-cellulose (FIG. 3) and diethylaminoethyl-cellulose (FIG. 4), respectively; and FIG. 5, gel filtration of acid carboxypeptidase by Sephadex G-75.

The optimum pH of said acid carboxypeptidase according to this invention falls more towards the acidic side than that of other known types of carboxypeptidase. For instance, the optimum pH of said enzyme in acting over such substrates as benzoxylcarbonyl-L-tyrosyl-L-leucine, benzoxycarbonyl-L-glutamyl-L-tyrosine, and benzoxycarbonyl-glycyl-L-prolyl-L-leucyl-glycine are 3.5, 3.1 and 3.2 respectively. In FIG. 1, curve A represents the pH-enzyme activity relationship when the reaction was conducted in the reaction mixture containing 0.025 percent benzoxycarbonyl-L-tyrosyl-L-leucine as substrate, 0.0025 percent crude enzyme preparation, and 0.005 M sodium acetate-hydrochloric acid buffer, under the temperature of 30° C; and curve B, the same relationship when 0.025 percent benzoxycarbonyl-L-glutamyl-L-tyrosine as substrate, and 0.025 percent crude enzyme preparation were used.

Here is described the substrate specificity of said acid carboxypeptidase. For convenience's sake here, a carboxyl terminal (as referred to C-terminal hereinafter) of substrate peptide chain will be expressed by R—X—Y where R stands for amino acids, peptides, or other acyl-substituted amino acids or peptides; and X and Y, for L-amino acids. Taking up carboxypeptidases A and B, the action of the former hydrolyzes the peptide linkage between X and Y, when amino acids on Y-position of C-terminal of substrate having free carboxyl radical are either neutral or acid amino acid residues, with the exception of proline; and the latter shows strong activity as in the above case only when amino acids on Y-position are basic amino acids. On the other hand, the activity of said acid carboxypeptidase according to this invention is the most strongly influenced by amino acid on X. For example, when the amino acid residue-X present in the substrate would be aromatic amino acid residue, such as tyrosine or phenylalanine, the hydrolytic activity of said enzyme is brought to the maximum. When X would be acid amino acid residue, such as glutamic acid, the activity is still high; but, when X would be leucine residue, then it somewhat decreases. Other amino acid residue, e.g., glycine, valine or proline, may be used, but the activity decreases markedly.

The hydrolytic activity of said acid carboxypeptidase on peptidases and amides is summarized comparatively in table I, in which the influence of various amino acid residues of substrate on the action of said enzyme is shown. The activity of said enzyme is expressed in table I by the relative quantity of the enzymatic activity which can release amino acids from various R—X—Y (with benzoxycarbonyl-L-tyrosyl-L-leucine as a standard), at 30° C., pH 3.5 for 1 min., by the action of said enzyme at a specific concentration so as to bring the extinction coefficient to 2.0 at 280 m$\mu$, unless otherwise noted.

TABLE I

Comparison of the hydrolytic activity of purified acid carboxypeptidase on peptides and amides*

| Substrate (R-X-Y) | Enzyme activity Enzyme unit |
|---|---|
| α-amino substituted peptides: | |
| (1) X = aromatic amino acid residue | |
| benzoxycarbonyl-L-tyrosyl-L-leucine | 67,874 |
| benzoxycarbonyl-L-phenylalanyl-L-leucine** | 51,866 |
| benzoxycarbonyl-L-phenylalanyl-L-tyrosine** | 24,864 |
| acetyl-L-phenylalanyl-L-diiodo tyrosine** | 16 |
| (2) X = acidic amino acid residue | |
| benzoxycarbonyl-L-glutamyl-L-phenylalanine** | 16,732 |
| benzoxycarbonyl-L-glutamyl-L-tyrosine | 9,110 |
| (3) X = leucine residue | |
| benzoxycarbonyl-L-prolyl-L-leucyl-glycine | 2,742 |
| (4) X = glycine residue | |
| benzoxycarbonyl-glycyl-L-leucine | 350 |
| benzoxycarbonyl-glycyl-L-phenylalanine | 224 |
| benzoxycarbonyl-glycyl-L-tryptophane | 20 |
| benzoxycarbonyl-glycyl-L-proline | 0 |
| benzoxycarbonyl-glycyl-L-prolyl-L-leucylglycyl-L-proline | 24 |
| benzoyl-glycyl-L-lysine | 86 |
| (5) X = valine residue | |
| benzoxycarbonyl-L-valyl-L-glutamic acid | 40 |
| (6) X = proline residue | |
| benzoxycarbonyl-glycyl-L-prolyl-L-leucine | trace |
| amides: | |
| benzoxycarbonyl-L-tyrosyl-L-leucyl-amide** | 0 |
| benzoxycarbonyl-L-tryptophanyl-phenylalanyl-amide** | 0 |
| benzoxycarbonyl-glycyl-L-phenylalanyl-amide** | 0 |
| benzoxycarbonyl-glycyl-L-leucyl-amide** | 0 |
| benzoxycarbonyl-L-alanyl-L-phenylalanyl-amide** | 0 |
| tripeptides: | |
| glycyl-glycyl-glycine | 0 |
| L-alanyl-glycyl-glycine | 0 |
| L-leucyl-glycyl-glycine | 0 |
| glycyl-glycyl-L-leucine | 0 |
| dipeptides: | |
| L-tyrosyl-L-leucine | 0 |
| glycyl-glycine | 0 |
| glycyl-L-leucine | 0 |
| glycyl-L-aspartic acid | 0 |
| L-leucyl-glycine | 0 |
| peptides containing D-amino acid residue: | |
| benzoxycarbonyl-L-tyrosyl-D-leucine | 0 |
| glycyl-D-aspartic acid | 0 |

*The concentration of substrate is 5×10⁻⁴M, with the following exception: 10⁻⁴M in case of benzoyl-glycyl-L-lysine and 5×10⁻³M in case of dipeptides and tripeptides.

**A portion of substrate becomes insoluble at pH 3.0.

It is an essential factor, as understood from the data in table I, that the carboxyl radical of the substrate must be free to cause the reaction of said acid carboxypeptidase. Said enzyme can be identified as a type of carboxypeptidase, as it demonstrates there is no reaction with the substrates, whose carboxyl radicals are blocked by amides and the like, e.g., benzoxycarbonyl-L-tyrosyl-L-leucyl-amide, benzoxycarbonyl-L-tryptophanyl-L-phenylalanyl-amide, benzoxycarbonyl-glycyl-L-phenylalanyl-amide, benzoxycarbonyl-glycyl-L-leucyl-amide, benzoxycarbonyl-L-alanyl-L-phenylalanyl-amide, and the like. However, from the natural characteristics as shown above and hereinafter, it is obvious that said enzyme still differs from the known carboxypeptidases A and B.

Furthermore, said enzyme differs completely from exopeptidases such as dipeptidase and tripeptidase in the mode of action. Precisely, it is important in hydrolysis of said enzyme that the amino radical of α-position of amino acid residue-X, i.e., next to C-terminal Y, should be blocked by acyl radicals or peptides. In other words, said enzyme does not react with dipeptides (e.g., L-tyrosyl-L-leucine, glycyl-glycine, glycyl-L-leucine, glycyl-L-aspartic acid, L-leucyl-glycine), and tripeptides (e.g., glycyl-glycyl-glycine, L-alanyl-glycyl-glycine, L-leucyl-glycyl-glycine, glycyl-glycyl-L-leucine).

It is also recognized in table I that hydrolysis by said enzyme is most strongly influenced by amino acid residues in the X-position; but, the amino acid residues in the Y-position and its vicinity can give some influence as well.

The rate of hydrolysis by said enzyme likely increases to a greater extent when α-amino radical of X-position is substituted by benzoxycarbonyl radical rather than by acetyl radical. Also, as the substrate specificity of said enzyme is largely affected by the amino acid residue of next to the C-terminal Y, i.e., of X, said enzyme acts slightly on the substrates whose C-terminal is basic amino acid, e.g., benzoyl-glycyl-L-lysine, and still a very little on the substrates which have proline in its C-terminal, e.g., benzoxycarbonyl-L-prolyl-L-leucyl-glycyl-L-proline. Another requirement besides the above-mentioned for substrate of said enzyme is that amino acid residue of substrate should necessarily be the L-form. Therefore, such substrate as benzoxycarbonyl-L-tyrosyl-D-leucine which have D-amino acid residues do not bring hydrolytic activity to said enzyme.

So far as described above, said enzyme differs completely from both carboxypeptidases A and B in substrate specificity. And, it further differs in the following aspects:

The activity of said acid carboxypeptidase is not inhibited by metal chelating reagents such as ethylenediaminetetraacetate (0.05 M) and o-phenanthroline, which remove metals linked with enzyme protein by coordinate bond. Therefore, it can be concluded that said enzyme contains no metal necessary for the catalytic action; and this is a significant difference which distinguishes said enzyme from other carboxypeptidases which contain metals taking part in catalytic action. The known exceptions are carboxypeptidase C extracted from citrus fruits and penicillium-peptidase B taken from micro-organisms belonging to genus Penicillium, whose activities are not affected by metal chelating reagents. However, the difference is still found where the active pH of said enzyme is considerably lower than that of the above two enzymes. Furthermore, it is mentioned in literature that the general properties of penicillium-peptidase B should be more like dipeptidases rather than of carboxypeptidases.

Again, unlike usual endopeptidases, said acid carboxypeptidase is incapable of cleaving peptide linkage in proteins or peptides. For instance, when a reaction mixture of said enzyme and protein is treated with trichloroacetic acid to obtain the precipitate of high molecular protein fraction, the trichloroacetic acid soluble fraction of the supernatant filtrate contains only free amino acids, but not peptides as decomposition product. Accordingly, said enzyme can be clearly distinguished from acid proteinases or other similar endopeptidases produced by Aspergillus whose optimum pH for action falls around 2.5–3.0.

Said acid carboxypeptidase is inactivated at 60° C. and over, and at pH 7.0 and over.

The molecular weight of said enzyme is estimated to be about 100,000 by Sephadex. The molecular weight of said enzyme is determined as 122,000 according to Yphantis's procedure. The sedimentation constant of said enzyme at zero concentration is estimated as 7.3 S. Compared with this, the molecular weight of acid protease produced from *Aspergillus saitoi* is 35,550; and those of carboxypeptidases A and B, 34,000 and 34,300 respectively. Here again a difference of said enzyme from others is noted.

From the above experimental facts, it is concluded that said acid carboxypeptidase is a new type of enzyme, and it has not been known yet.

The activity of said acid carboxypeptidase is then assayed according to the following methods:

One milliliter of reaction mixture consisting of a certain quantity of said acid carboxypeptidase and $5 \times 10^{-4}$ M of benzoxycarbonyl-L-tyrosyl-L-leucine dissolved in 0.05 M acetate buffer (pH 3.5) or $5 \times 10^{-4}$ M of benzoxycarbonyl-L-glutamyl-L-tyrosine in buffer solution of pH 3.1, is incubated at 30° C. for 20 min. At the end of reaction, it is held at 30° C. for 30 min. with the addition of 200 μl. of 0.3 M sodium hydroxide solution to inactivate residual enzyme. Such alkali reaction mixture is neutralized by 200 μl. of 2.5 percent acetic acid, and thereafter, with the addition of 2.0 ml. of 0.5 M citric acid buffer (pH 5.0) and 1 ml. of ninhydrine mixture which is prepared by Yemm-Cocking method [E. Cocking and E. W. Yemm: Biochem. J. 58, XII (1954)], it is heated in boiling water. After 15 min. of heating, it is agitated violently while cooling with ice, and brought to the volume of 5 ml. by adding aqueous solution of ethyl alcohol (2:1 v./v.). And, finally the color yield by ninhydrin reagent is determined by measuring the absorbency at 570 mμ, that indicating the amount of amino acid.

One unit of said enzyme activity is defined as the amount of enzyme which can release 1 μM L-leucine from benzoxycarbonyl-L-tyrosyl-L-leucine as substrate, at pH 3.5 and at 30° C. for 1 min. When other substrates are used, the quantity of amino acids released by enzyme reaction is determined as leucine equivalent and expressed by relative enzyme unit. Leucine or other amino acids released as the reaction products can be detected by ninhydrin reagent after developing with a thin-layer chromatography by silica gel G as adsorbent, or by amino acid automatic analyzer.

The preparation of said acid carboxypeptidase is disclosed as follows:

Some of the molds belonging to genus Aspergillus which are used in this invention are: *Aspergillus usamii, Aspergillus saitoi, Aspergillus niger, Aspergillus inuii, Aspergillus aureus, Aspergillus awamori, Aspergillus nakazawaii, Aspergillus oryzae, Aspergillus sojae*, etc. Some example of the strains of these molds are: *Aspergillus usamii* R-0635 (ATCC 14331), *Aspergillus saitoi* R-3813 (ATCC 14332), *Aspergillus niger* NRRL 330, *Aspergillus inuii* R-3631 (ATCC 14333), *Aspergillus aureus* R-4523, *Aspergillus aureus* R-6512 (ATCC 14334), *Aspergillus awamori* R-3523, *Aspergillus awamori* IAM 2390 (ATCC 14335), *Aspergillus nakazawaii* R-6822Y, *Aspergillus oryzae* var. *magnasporus* A-1-5, *Aspergillus sojae* KS, and so on. However, the strains used according to this invention are not limited to these strains, or varieties and mutants thereof; but, all strains of molds belonging to genus Aspergillus, which can produce acid carboxypeptidase, can be used in this invention.

The cultivation of the above-named strains according to this invention can be performed either in solid medium or in liquid medium.

In the case of solid culture (koji method), the materials for medium such as wheat bran, defatted soybean, and the like, are mixed with appropriate nutrients such as ammonium chloride, if necessary, and water. The mixture is sterilized under steam pressure and is cooled. And, after cooling, seed culture is inoculated and mixed well. Then, the incubation is carried out at 25°–40° C. for 50–90 hr.

At the end of incubation, 5–20 times volume of water is added, and it is held for 60–70 min. and thereafter extraction of crude enzyme preparation is carried out under pressure. The extracted liquor is further run through filtration, by which suspended solids, spores and other foreign substances are removed. Again, the obtained filtrate is cooled to 1°–5° C., and 95 percent ethyl alcohol (2.5–3.0 times volume) which has been cooled before the 1°–5° C. is added. The mixture is thoroughly agitated and allowed to settle for 10 hr. or more. The precipitate is lyophilized under 0.1 mm. Hg, and the crude enzyme preparation of acid carboxypeptidase is obtained. In place of ethyl alcohol, acetone, methanol or isopropanol can be used as precipitation solvent.

To carry out submerge culture, the liquid medium consisting of appropriate carbon sources, nitrogen sources and other nutrients necessary for the growth of strain, is prepared, and seed culture is inoculated. (An example is that the water suspension of seed culture is added to liquid medium as inoculum.) Wheat bran, starch, glucose and so forth are used as carbon source of the medium; and as nitrogen sources, soybean, casein, meat extract and so forth as organic materials, and ammonium chloride and other inorganic materials are used. Besides, such ingredient as phosphate or other inorganic salts can be optionally used. Conditions in process of submerge culture are adjusted to bring the activity of the desired acid carboxypeptidase to its maximum, by selection of strains to be employed and other factors. In case, for instance, *Aspergillus usamii* is employed, it is desirable to adjust pH of the medium to 3.0 to 6.0, and the temperature to 30° C. or thereabout; and the incubation is carried out for 50 to 100 hr.

Submerge culturing can be performed under stationary conditions, shaking, agitation, or aeration. But, in a large scale cultivation, it is more effectively performed under aeration-agitation.

After cultivation is over, cultured mash is filtered, and the filtrate is concentrated, if necessary, and adjusted to about pH 4.0. Then, after the second filtration, the filtrate is taken, as in the case with solid culture, for precipitation by alcohol and thereafter lyophilized to obtain crude preparation of acid carboxypeptidase.

The crude enzyme preparation as above-obtained is purified by properly selecting and/or combining the methods such as salting-out, adsorption-elution by various ion exchange agents (e.g., Duolite CS-101, phospho-cellulose and diethylaminoethyl-cellulose), gel filtration to fractionate according to molecular weight, and others.

An example of the analyses of the product obtained is illustrated in table II below in which the activity of acid carboxypeptidase obtained by solid culture of wheat bran with molds belonging to genus Aspergillus, is measured.

TABLE II

| Strain | Enzyme unit/solid culture product (koji) g. |
|---|---|
| *Aspergillus usamii* R-0635 | |
| (ATCC-14331) | 18,800 |
| *Aspergillus saitoi* R-3813 | |
| (ATCC-14332) | 14,400 |
| *Aspergillus niger* NRRL 330 | 9,500 |
| *Aspergillus inuii* R-3631 | |
| (ATCC-14333) | 6,300 |
| *Aspergillus aureus* R-4523 | 6,900 |
| *Aspergillus aureus* R-6512 | |
| (ATCC-14334) | 5,000 |
| *Aspergillus awamori* R-3523 | 15,000 |
| *Aspergillus awamori* IAM 2390 | |
| (ATCC-14335) | 10,000 |
| *Aspergillus nakazawai* R-6822Y | 3,300 |
| *Aspergillus oryzae* var. | |
| magnasporus A-1-5 | 15,700 |
| *Aspergillus sojae* KS | 4,900 |

The following examples are used for the purpose of illustration only and do not limit the invention therein.

EXAMPLE 1

Eight-hundred forty kilograms wheat bran was sprinkled with 500 l. water and sterilized for 40 min. with pressured steam of 1.1 kg./sq. cm. After cooling of above, 3 kg. seed culture of *Aspergillus saitoi* R-3813 which had been pure-cultured separately was inoculated; and such was thoroughly mixed. It was then placed onto 1,600 koji trays and incubated for about 50 hr. under the temperature kept between 30° and 45° C. The koji trays were transposed once every 2 days, when the temperature of the culture rose.

At the completion of the above culture, the material was transferred to an extractor in which it was held for 60-70 min. with 3,000 l. water added. Then, the extraction was carried out under pressure of 60 kg./sq. cm. As the result, 2,400 l. of liquid, about 80 percent of the added water, was obtained, and it was further filtered through a proper filtration unit to remove suspended solids, spores and so on. The filtrate obtained thereafter was collected into a precipitation tank where it was cooled to 1°-5° C. with brine and added with 2.5-3.0 times volume of 95 percent alcohol which had previously been cooled to 1°-5° C. Such mixture with alcohol was agitated thoroughly and held for more than 10 hr. to accomplish the precipitation. Then the precipitate was further separated through continuous filter and immediately after that, lyophilized under 0.1 mm. Hg. The dried product was crushed from which 16 kg. of crude acid carboxypeptidase preparation was collected. The enzymatic activity of this crude preparation was $3.14 \times 10^6$ enzyme unit per 1 g., and the yield was 60 percent.

EXAMPLE 2

The mixture of 90 kg. wheat bran, 160 kg. defatted soybean and 40 kg. ammonium chloride was sterilized, after water was added, under pressure of 3 kg./sq. cm. for 1 hr., and transferred to 20-kl. fermentor in which water was added to bring the total volume to 10 kl. Upon adjusting the initial pH to 5.5 and the temperature of the medium to 35° C., it was inoculated with seed spores in suspension which had been separately pure-cultured by thoroughly mixing 100 g. seed culture of *Aspergillus saitoi* R-3813 with 500 ml. sterile water. Then, the incubation was carried out under aeration and agitation at 35° C.

After 4 days of incubation, the cultured medium was filtered through appropriate filter with filter aid. The filtrate was concentrated under reduced pressure of 35 mm. Hg, at 35° C. 1,500 l. liquid obtained as the result was thereafter adjusted to pH 4.0 with inorganic acid as hydrochloric acid and further filtered. Then, following the steps as in example 1, the precipitation by ethyl alcohol and lyophilization were conducted, and 20 kg. crude enzyme in powder form was obtained. The activity of acid carboxypeptidase thus obtained was $7.8 \times 10^6$ unit per 1 g., and the yield was 60 percent.

When salting-out by ammonium sulphate was conducted instead of precipitation by alcohol as in examples 1 and 2, the precipitation with ammonium sulphate at 70 percent gave the highest yield to acid carboxypeptidase, i.e., 60 percent.

EXAMPLE 3

Weakly acidic cation exchange resin, Duolite CS-101, (Diamond Alkali Co., U.S.A.), which was preliminary buffered with 0.001 M acetate buffer, was packed in a chromatography column (2 cm. diameter) up to the height of 40 cm. A 20-ml. crude enzyme solution dissolving 500 mg. crude enzyme preparation as obtained in example 2 was applied to the column, and it was chromatographed. The chromatography was carried out using a 300-ml. mixing chamber with stirrer which was equipped on the passage between stock solution and the chromatography column, enabling the operation to run continuously up to the point where pH of the eluate became the same as the pH of acetate buffer of 0.15 M stock solution, i.e., pH 5.2. Thereafter, fractions of each 5 ml. were collected.

The result of chromatography of acid carboxypeptidase by Duolite CS-101 was shown in FIG. 2. It was found that, while the fraction of acid proteinase (or, Aspergillopeptidase A) produced by strain of genus Aspergillus was nearly completely adsorbed on the resin, causing therefore slow elution, said enzyme according to this invention was hardly adsorbed on and easily eluted from the resin. There was hardly any acid proteinase contained in said acid carboxypeptidase fraction which was easily eluted. The recovery of said enzyme was about 50±15 percent, with a slight deviation by each operation of chromatography. The enzyme fraction obtained above was then concentrated with collodion bag or taken for the second step of purification after dialysis against 0.005 M acetate buffer (pH 4.0).

Duolite CS-101 may be replaced by Amberlite CG-50 (Rohm and Haas, U.S.A.), by which a similar result can be obtained.

The second step of chromatography is to separate said acid carboxypeptidase by phospho-cellulose (Brown, U.S.A. or Tohoku Pulp, Japan) which is cationic exchange cellulose. Phospho-cellulose which was preliminarily equilibrated with 0.005 M acetate buffer (pH 4.0) was packed in a chromatography column (2 cm. diameter), up to the height of 50 cm. In the column, 100 ml. acid carboxypeptidase fractionated as per the first chromatography was adsorbed, and the chromatography was performed with 0.05 M sodium chloride dissolved in 0.005 M acetate buffer (pH 4.0), continuously through a 500-ml. mixing chamber. Fractions were collected by 5 ml. each.

The result of the above chromatography on phospho-cellulose is illustrated in FIG. 3. The recovery of said enzyme was about 60 percent. Said enzyme fractions were collected and dialyzed against 0.005 M acetate buffer (pH 5.0), and thereafter taken either to the next step of purification or to concentration for preservation.

The third step of chromatography was carried out using diethyl amine ethyl cellulose (Brown, U.S.A.) which is anionic exchange resin. Diethyl-aminoethyl-cellulose equilibrated with 0.005 M acetate buffer (pH 5.0) was packed in a chromatography column (2 cm. diameter) up to the height of 50 cm. Upon said resin in the column, 194 ml. acid carboxypeptidase obtained by the preceding chromatography was adsorbed, and the chromatography was carried out introducing sodium chloride dissolved in 0.005 M acetate buffer (pH 3.0), continuously through a 500-ml. mixing chamber. Fractions were then collected by 5 ml. each.

The result of the above chromatography with diethyl aminoethyl-cellulose was illustrated in FIG. 4. Recovery of said carboxypeptidase was about 60 percent. Fraction obtained was chromatographed again as before. Recovery thereafter was about 80 percent. Then, the active fraction collected was dialyzed and concentrated for preservation.

The fourth step of purification was gel filtration on Sephadex G-75 (Pharmacia, Sweden). The column size was 2 cm. in diameter and 65 cm. in height. Sephadex G-75 was equilibrated with 0.01 M acetate buffer before being applied to the column. The lyophilized enzyme preparation obtained above was dissolved in 5 ml. acetic acid solution and poured on to the upper portion of the column where gel filtration was performed with same acetic acid solution. Fractions were then collected, 5 ml. each.

The pattern obtained by gel filtration on Sephadex G-75 is illustrated in FIG. 5. Recovery was 76 percent. It was evidenced from the above that said acid carboxypeptidase is eluted far more rapidly than acid proteinase (Aspergillopeptidase A) whose molecular weight is 35,000, indicating that it is therefore an enzyme having higher molecular weight.

The enzyme preparation obtained above was lyophilized directly or after salting-out to obtain pure acid carboxypeptidase preparation.

Furthermore, disc-electrophoresis was performed on the above enzyme preparation at pH 8.0 [D. E. Williams, R. A. Reisfeld: Ann. New York Acad. Sci. 121, 373 (1964)], and said enzyme demonstrated that it was homogeneous electrophoretically. The purified said enzyme preparation appears to be homogeneous on ultracentrifugation, and the sedimentation constant at zero concentration is calculated as 7.3 S.

We claim:

1. A process for the production of a new enzyme, acid carboxypeptidase, comprising the steps of
  a. cultivating an organism selected from the group consisting of: Aspergillus usamii R-0635 (ATCC-14331); Aspergillus saitoi R-3813 (ATCC-14332); Aspergillus niger NRRL 330; Aspergillus inuii R-3631 (ATCC-14333); Aspergillus aureus R-4523; Aspergillus aureus R-6512 (ATCC-14334); Aspergillus awamori R-3523; Aspergillus awamori IAM 2390 (ATCC-14335); Aspergillus nakazawai R-6822Y; Aspergillus oryzae var. magnasporus A-1–5; Aspergillus sojae KS; and
  b. recovering from material selected from the culture broth and preparations therefrom acid carboxypeptidase which reacts hydrolytically with the terminal carboxyl group of proteins or peptides to give an amino acid and has an optimum pH of about 3.1 to 3.5 at a temperature of about 30° C. in acting on a substrate selected from the group consisting of benzoxycarbonyl-L-tyrosyl-L-leucine, benzoxycarbonyl-L-glutamyl-L-tyrosine, and benzoxycarbonyl-glycl-L-prolyl-L-leucyl-glycine contains no metal, has a molecular weight of about 122,000 and is inactive at 60° C. or more or a pH of 7 or more.

* * * * *